United States Patent Office 3,302,604
Patented Feb. 7, 1967

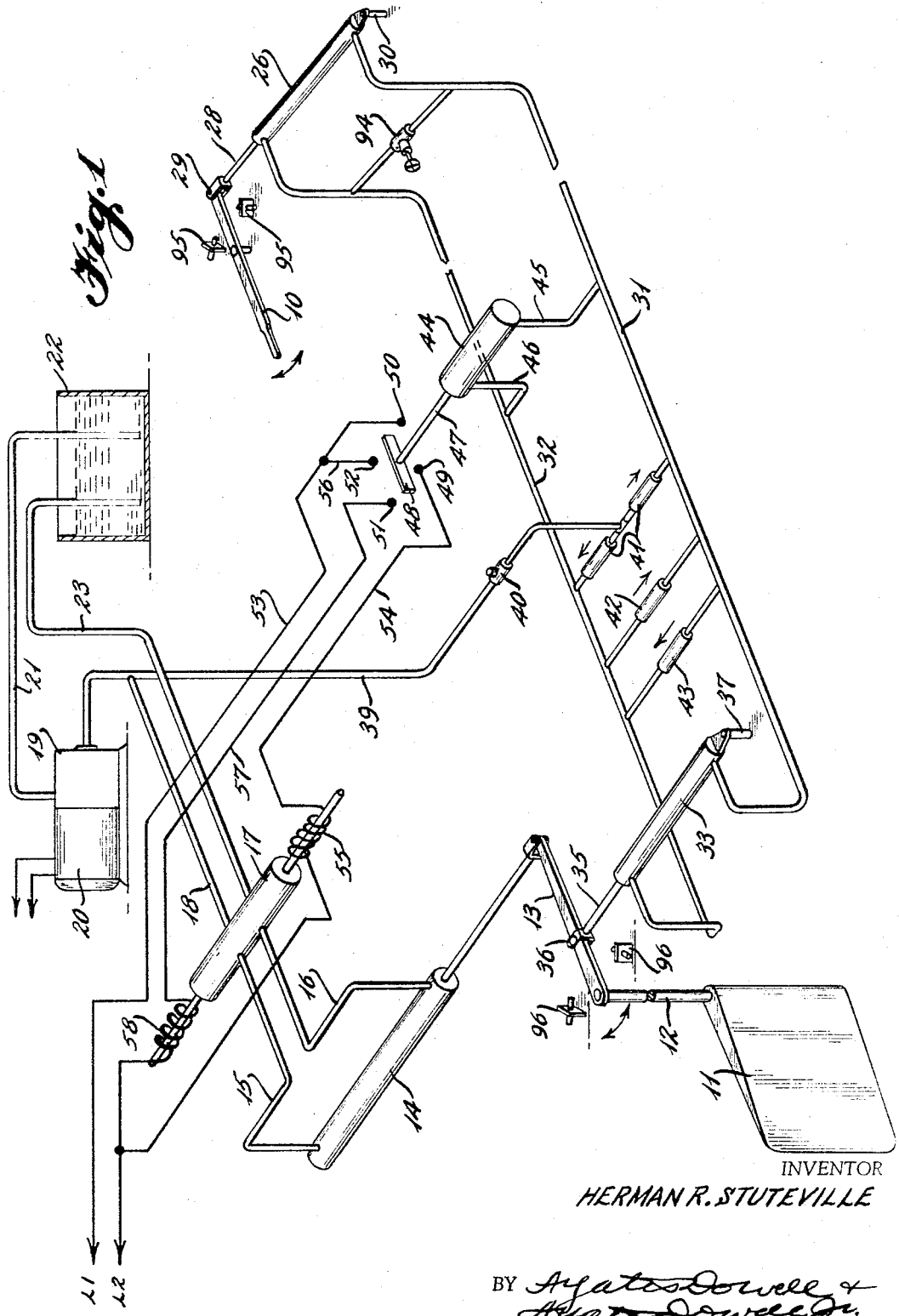

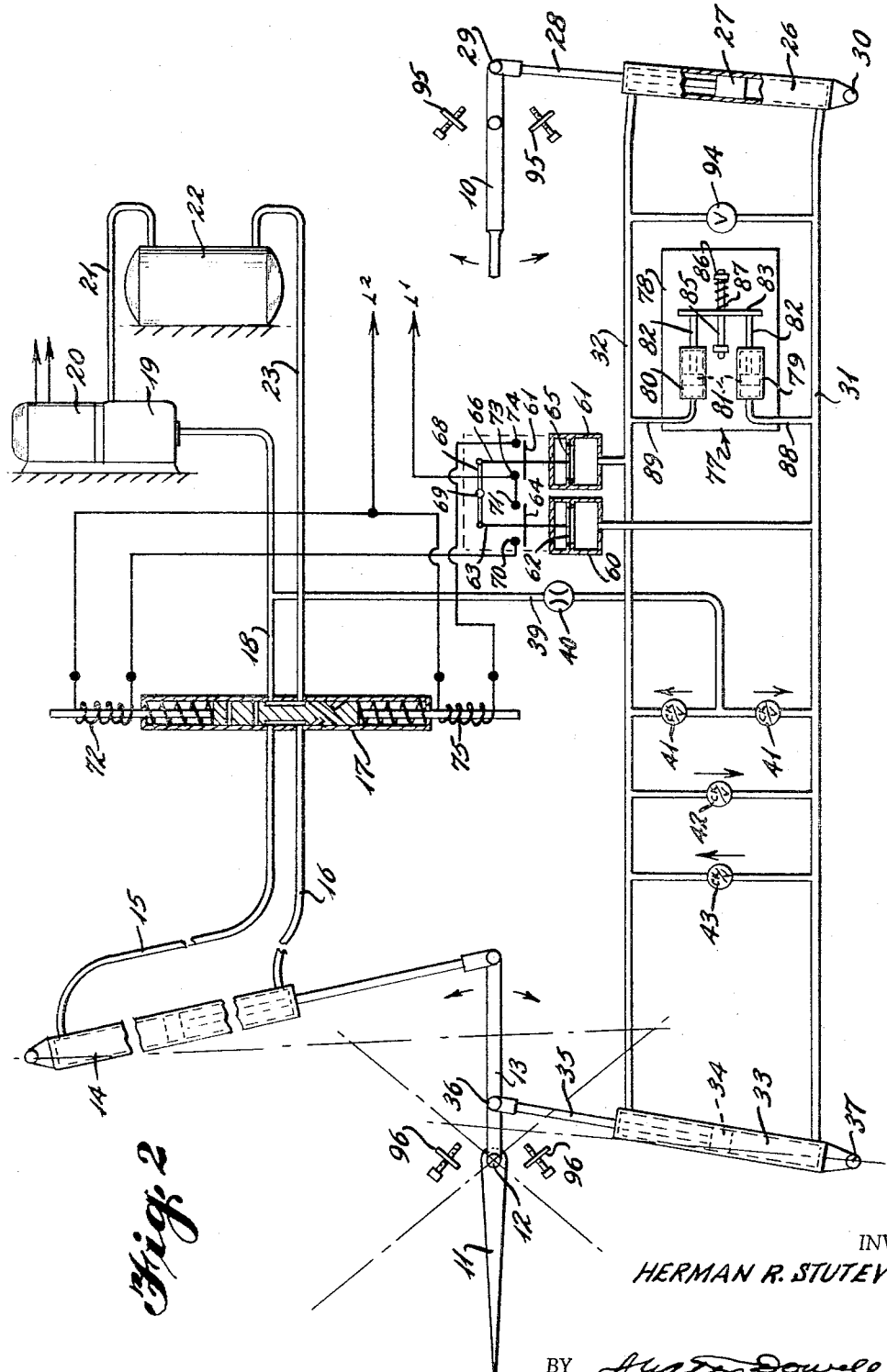

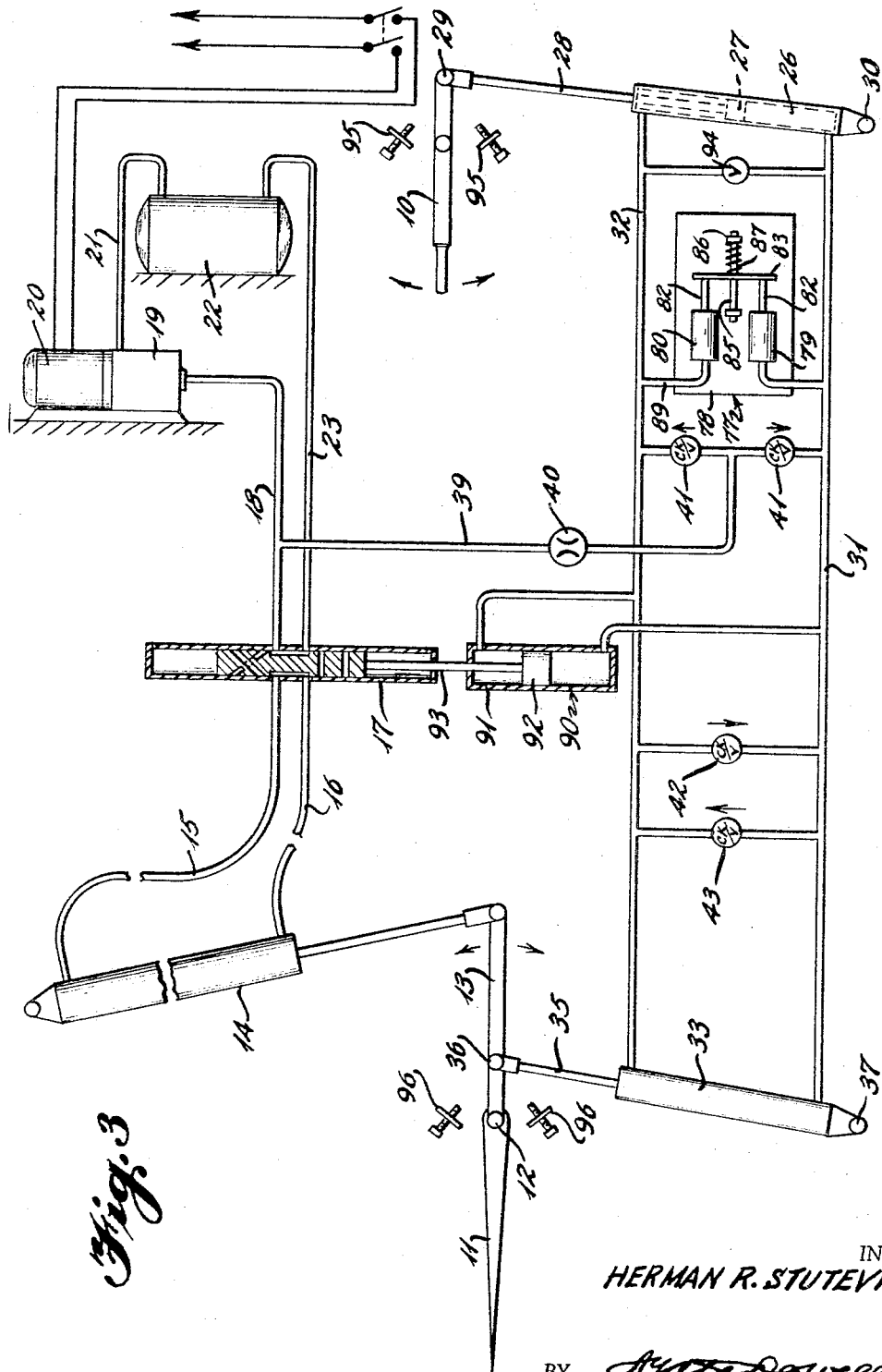

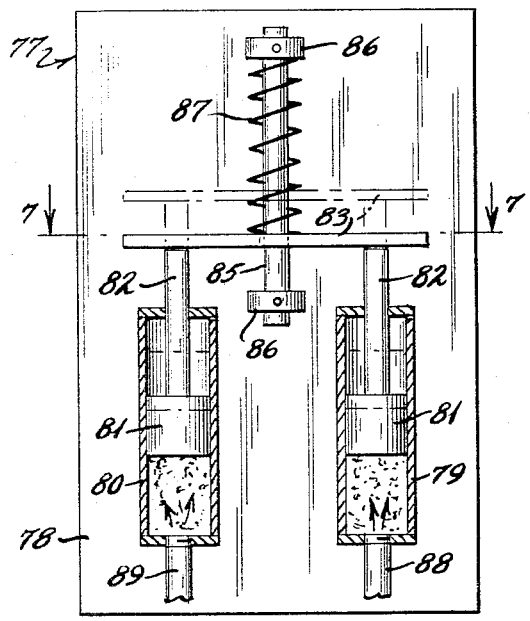
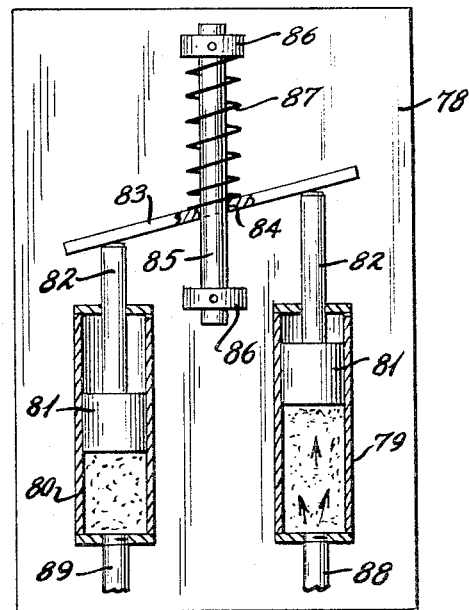
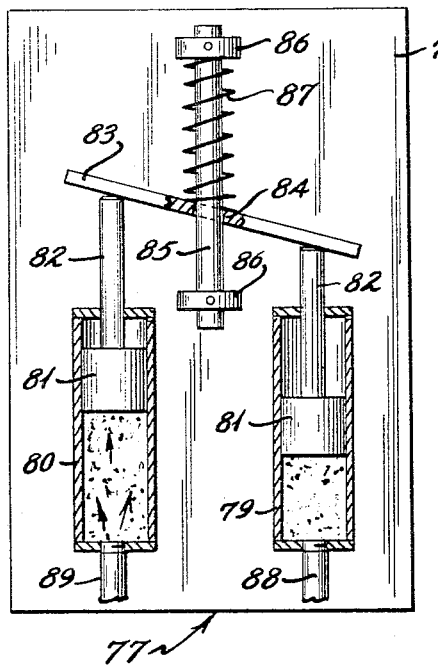
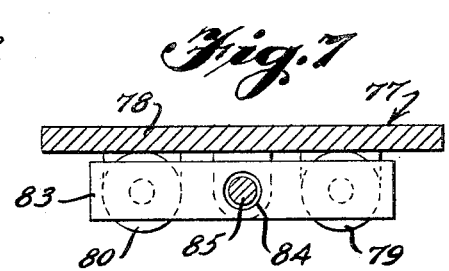

3,302,604
FLUID ACTUATED FOLLOW-UP STEERING
CONTROL MECHANISM
Herman R. Stuteville, Nashville, Tenn., assignor to
Nashville Bridge Company, Nashville, Tenn.
Filed Sept. 7, 1965, Ser. No. 485,168
6 Claims. (Cl. 114—150)

This invention relates to the control and maneuverability of movable vehicles through water, air or other mediums, as well as to apparatus and equipment whereby such vehicles can be maneuvered in a faster, easier and more positive manner.

The invention relates particularly to a follow-up steering control mechanism for a boat or other vehicle which is adapted to operate the steering mechanism by means of a fluid pressure differential system subject to the control of a helmsman in a positive manner, in a minimum of time and with minimum effort.

For many years ship steering follow-up controls have been constructed on the principle of a floating lever. The lever is pivoted on a control valve or pump stroking mechanism in such a manner that displacement of the mechanism in one direction will cause the ship to turn in one direction and displacement of the mechanism in the other direction will cause the ship to turn in the opposite direction.

When the helmsman operates the steering lever or wheel, the first motion of the floating lever is to stroke the valve and operate the steering machinery to move the rudder in such a manner as to close the valve. A steady pressure is kept on the helm to keep the valve open ahead of the rudder motion tending to close the valve until the desired heading of the ship is reached or until the helm engages mechanical stops which are arranged so that helm motion stops before the steering gear reaches the end of its travel. In this way, the last few degrees of rudder travel act to close the valve. The floating lever is normally connected to the pilot house and the steering gear by push-pull rods or aircraft control cables.

It is an object of the invention to provide a fluid actuated follow-up steering control mechanism having a fluid-operated actuator and a control valve which can be located at any point between the steering station and the steering gear room.

Another object of the invention is to provide a double acting piston type actuator for operating the steering gear control valve.

Still another object of the invention is to provide a differential pressure type actuator for operating the steering gear control valve.

A further object of the invention is to provide a pressure-volume compensator connected to a pair of fluid lines which will accommodate increases in pressure or volume in both lines but which will lock when pressure or volume is increased in either line or not the other.

A still further object of the invention is to provide a fluid actuated follow-up control mechanism which will function as a power booster and positioner so that a machine of infinite size can be directed or positioned.

Other objects and advantages of the invention will be apparent from the following description taken in conjunction with the accompanying drawings in which:

FIG. 1 is a diagrammatic perspective of one embodiment of the present system;

FIG. 2, a diagrammatic plan view of another embodiment thereof;

FIG. 3, a diagrammatic plan view of a still further embodiment;

FIG. 4, an enlarged plan view illustrating the pressure-volume compensator in balanced condition;

FIG. 5, a similar view illustrating the compensator in unbalanced condition to one side;

FIG. 6, a view similar to FIG. 5 showing the compensator unbalanced to the opposite side; and FIG. 7, a section on the line 7—7 of FIG. 4.

Briefly stated the present invention is a fluid actuated follow-up steering control mechanism having a first fluid cylinder located adjacent to the helm and a second fluid cylinder located adjacent to the steering tiller and connected thereto. The first and second fluid cylinders are connected in a closed circuit by a pair of fluid lines and maintained under a predetermined pressure. An actuator is disposed intermediate the first and second cylinders and such actuator is adapted to stroke the steering gear mechanism in response to an increase in pressure in one of the fluid lines, and such steering gear mechanism will operate the rudder tiller to control the maneuverability of the vessel. A pressure-volume compensator is provided which is connected to both fluid lines and which will accommodate increases in pressure or volume in both lines simultaneously but will lock when either pressure or volume is increased in one line but not in the other.

With continued reference to the drawings, a conventional boat or other vessel (not shown) is provided with a helm 10 which may be a lever or steering wheel adapted to control the position of a rudder 11 mounted on a stem 12 to the upper end of which is connected a tiller 13. The tiller may be operated in any conventional manner using steam, electricity, hydraulic fluid, or any combination thereof as a motivating force.

As illustrated the tiller is operated by a hydraulic cylinder 14 connected by fluid lines 15 and 16 to a distributor or control valve 17. Such control valve is supplied with hydraulic fluid under pressure through a fluid line 18 from a pump 19 operated by a motor 20, and such pump is connected by a fluid line 21 to a reservoir 22. The control valve 17 is provided with a fluid line 23 for returning fluid to the reservoir 22.

The control mechanism of the present invention includes a fluid cylinder 26 located adjacent to the helm 10 and having a piston 27 connected by a piston rod 28 to such helm by a pivot pin 29. The cylinder 26 may be pivotally mounted on a pivot pin 30 to the fixed structure of the vessel, or if desired the cylinder 26 may be fixed and the piston rod 28 may be connected to the helm 10 by a connecting link (not shown).

The cylinder 26 is connected by fluid lines 31 and 32 to a fluid cylinder 33 located in the steering room of the vessel. The cylinder 33 has a piston 34 with a piston rod 35 extending from the cylinder, and such piston rod may be connected to the tiller 13 by a pivot pin 36 in which case the cylinder 33 would be mounted by a pivot pin 37 to the fixed structure of the vessel. If desired the fluid cylinder 33 likewise may be fixed and the piston rod 35 may be connected by a conventional connecting link (not shown) to the tiller 13.

The fluid cylinders 26 and 33 and the fluid lines 31 and 32 form a closed system which is adapted to be maintained at a predetermined pressure of approximately 10 to 20 p.s.i. In order to maintain a constant pressure within the system a fluid line 39 having a pressure valve 40 therein is connected to the fluid line 18 and diverts fluid through a pair of one-way check valves 41 to the fluid lines 31 and 32. It will be apparent that the pressure valve 40 is adjustable to reduce the pressure of the fluid in line 18 to the desired amount.

A pair of one-way relief valves 42 and 43 interconnect the fluid lines 31 and 32 with one of the relief valves permitting the flow in one direction between the lines, and the other relief valve permitting flow in the opposite direction when pressure in the system exceeds a predetermined value. The valves 42 and 43 are located adjacent to the second cylinder 33 to prevent an increase in pressure on either line from damaging the system.

With particular reference to FIG. 1, an actuator 44, of the fluid cylinder type, is provided and such actuator is connected by fluid lines 45 and 46 to the lines 31 and 32, respectively. The actuator 44 has a piston and a piston rod 47 extending therefrom and such piston rod has an electrical contact bar 48 fixed to the outer end thereof.

A first pair of electrical contacts 49 and 50 are located adjacent to one side of the contact bar 48 and a second pair of electrical contacts 51 and 52 are located adjacent to the other side of such contact bar. When the contact bar 48 is moved in one direction, it will bridge the gap between contacts 49 and 50 and complete a circuit from a source of electrical energy through lines 53 and 54 to a solenoid 55 to move the control valve 17 in one direction. When the contact bar is moved in the opposite direction it will bridge the gap between contacts 51 and 52 and complete a circuit through lines 56 and 57 to a solenoid 58 to move the control valve 17 in the other direction.

In this embodiment of the invention when the helm 10 is moved to the left, as viewed in FIG. 1, pressure will be exerted by the piston 27 on the fluid in fluid line 31. Since the cylinder 33 cannot move, the pressure will be diverted through the line 45 into the actuator 44 and cause the piston rod 47 and contact bar 48 to be extended until the contact bar bridges the gap between the contacts 51 and 52 to energize the solenoid 58. Actuation of the solenoid 58 will cause the control valve 17 to shift so that fluid from the fluid line 18 will be directed into one end of the cylinder 14 which in turn will move the tiller 13 in one direction and move the rudder 11 and cause the vessel to turn. Movement of the helm 10 in the opposite direction will reverse the flow of fluid and cause the rudder 11 to be moved in the opposite direction to turn the vessel in the other side.

With reference to FIG. 2 a modified form of the invention is provided which is similar in construction to the system illustrated in FIG. 1 except that the actuator includes a pair of differential pressure switches 60 and 61 with the switch 60 being connected to the fluid line 31 and the switch 61 being connected to the fluid line 32. The switch 60 includes a diaphragm 62 which engages a rod 63 having a contact bar 64 mounted thereon intermediate its ends. The switch 61 has a diaphragm 65 which engages a rod 66 having a contact bar 67 mounted thereon intermediate its ends. The free ends of the rods 63 and 66 are connected by a link 68 which is pivotally mounted on a pivot pin 69 to the fixed structure of the vessel. A pair of electrical contacts 70 and 71 are located adjacent to the contact bar 64 and such contacts control the flow of electric current from a source of energy to a solenoid 72 to move the control valve 17 in one direction and introduce hydraulic fluid into the cylinder 14 to move the rudder 11. A pair of electrical contacts 73 and 74 are located adjacent to the contact bar 67 to control the flow of electricity to a solenoid 75 to move the control valve 17 and consequently the rudder 11 in the opposite direction.

In order to accommodate variations in the pressure or volume of fluid lines 31 and 32, a pressure-volume compensator 77 is provided having a base 78 on which a pair of fluid cylinders 79 and 80 are mounted. Both of the cylinders 79 and 80 are provided with pistons 81 mounted on one end of piston rods 82 and the opposite end of each of such rods abuts a sliding plate 83. The plate 83 has a central opening 84 slidably mounted on a shaft 85 mounted by brackets 86 on the base 78. A spring 87 is disposed about the shaft 85 between one of the brackets 86 and the sliding plate 83 to exert a tension on the piston rods 82 and tending to force the pistons 81 into the cylinders 79 and 80. The opposite end of the cylinder 79 is connected by a fluid line 88 to the fluid line 31 and the opposite end of the cylinder 80 is connected by a fluid line 89 to the fluid line 32.

Since the fluid pressure within the cylinders 26 and 33 and the fluid pressure within fluid lines 31 and 32 are substantially equal when the system is at rest, any increase in pressure or increase in volume caused by heat or the like will cause the fluid to enter both cylinders 79 and 80 to overcome the tension of the spring 87 and raise the sliding plate 83. When the system is energized by movement of the helm, fluid pressure within one of the lines 31 or 32 will be increased which will tend to raise the piston 81 of the cylinder connected to the line with the increased pressure. Upward movement of the piston rod will cock or tilt the sliding plate 83 and cause the sides of the opening 84 to frictionally engage the shaft 85 and lock the sliding plate against further movement so that the increase in pressure will be transmitted to the actuator. As soon as the pressure is relieved the spring 87 will again force the sliding plate downwardly until the pressure within the lines 31 and 32 again is substantially equal.

With reference to FIG. 3 a further embodiment of the invention is provided which is similar to the construction of FIGS. 1 and 2 except that an actuator 90 of slightly different construction is provided. In this embodiment the actuator includes a fluid cylinder 91 having a piston 92 connected to one end of a piston rod 93, the opposite end of which is directly connected to the distributor of the control valve 17 so that when pressure is increased in one of the fluid lines 31 or 32 such pressure will be transmitted to the actuator 90 which will cause the control valve to shift and direct fluid to the cylinder 14 to move the rudder 11.

A manually controlled bypass valve 94 is disposed between the lines 31 and 32 to permit the fluid cylinders 26 and 33 to be synchronized. The helm 10 preferably is provided with mechanical or electrical stops 95 to limit the movement thereof to approximately 40° to either side of the center and the tiller 13 has a pair of stops 96 to limit the movement of the tiller a corresponding amount.

It is noted that an inherent feature of this system is that the pressure exerted by the piston rod 35 of the cylinder 33 against the tiller 13 will function as a power booster or power assist to rotate such tiller. In the event that the piston rod 35 is connected to a relatively light mechanism, the cylinder 33 could move the mechanism directly and the actuator could be used to energize a power boost so that in case of a power failure, the mechanism would operate directly.

Also, the device is a power positioner and may be used anywhere that a pilot controlled positioner is desired. By using the present structure a machine of infinite size can be directed and/or positioned.

In the operation of the device the helm 10 is moved to one side and movement of the helm will move the piston 27 in the cylinder 26 and cause an increase in pressure in one of the lines 31 or 32. Since the piston 34 in the fluid cylinder 33 cannot move due to the fact that it is connected by the piston rod 35 to the tiller 13, the increase in pressure will be transmitted to the actuator 44, 59 or 77, which in turn will cause operation of the control valve 17 to move the tiller 13. Movement of the tiller will cause movement of the piston rod 35 and the piston 34 within the cylinder 33 to tend to equalize the pressure within the fluid lines 31 and 32. As soon as the desired degree of turn is reached the pressure on the helm is relieved and the pressure within the lines 31 and 32 will return to equalization. As soon as the pressure is substantially equal the actuator and the control valve will be returned to their initial position and the rudder and helm will remain in fixed position with the helm indicating the amount of turn. At the completion of the turn or maneuver the helm is moved back to a midship position and the system will operate in the reverse direction until the rudder likewise is in a midship position.

It will be obvious that a relatively simple fluid actuated follow-up steering control mechanism has been provided which is simple and economical to operate and which will render positive control of the rudder of a vessel.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. Apparatus for controlling the operating of a steering mechanism of a vessel having a helm and a rudder from a remote position comprising a first fluid cylinder located adjacent to said helm, said first cylinder having a piston connected to said helm, a second fluid cylinder located adjacent to said rudder, said second cyliner having a piston connected to said rudder, a pair of fluid lines connecting said first and second cylinders in a closed balanced fluid system, a pressure responsive actuator connected to said pair of fluid lines intermediate said first and second cylinders, and means carried by said actuator for selectively operating said steering mechanism, whereby when said helm is operated in either direction the piston of said first cylinder will cause the pressure in one of said fluid lines to be increased and will operate said actuator and said steering mechanism to move said rudder and movement of said rudder will move the piston of said second cylinder to return said fluid lines and said actuator to balance condition, thereby deactivating said steering mechanism.

2. The structure of claim 1 in which said actuator includes a fluid cylinder having a piston and piston rod, an electrical contact bar mounted on said piston rod, solenoid means carried by said steering mechanism, and electrical contact means located adjacent to said contact bar on said piston rod and connected to said solenoid means, whereby movement of said piston rod will complete a circuit to said solenoid means to operate said steering mechanism.

3. The structure of claim 1 in which said actuator includes a pressure differential switch connected to each of said lines, each of said switches having a diaphragm, electrical connection means connected to each diaphragm, solenoid means carried by said steering mechanism, and electrical contact means located adjacent to said connection means and connected to said solenoid means, whereby an increase of pressure in either of said lines will expand the diaphragm of that line and cause the connection means to complete a circuit to said solenoid means to operate said steering mechanism.

4. The structure of claim 1 in which said actuator includes a fluid cylinder having a piston and piston rod, and said piston rod being directly connected to said steering mechanism, whereby movement of said piston rod will operate said steering mechanism.

5. The structure of claim 1 including a pressure-volume compensator connected to said fluid lines, said compensator comprising fluid cylinder means connected to each fluid line, each cylinder means having piston rod means extending therefrom, a sliding plate engaging said piston rod means, said sliding plate having an opening, and a shaft slidably received in said opening, whereby said sliding plate can be moved when both cylinder means are operated simultaneously but will lock against said shaft when either piston rod is moved without the other.

6. A pressure-volume compensator for a differential fluid pressure system comprising a base, a pair of fluid cylinders mounted on said base in generally parallel relation to each other, each cylinder having a piston rod extending therefrom, shaft means mounted on said base intermediate said piston rods, plate means having an opening slidably mounted on said shaft means, said plate means engaging said piston rods on opposite sides of said shaft means, spring means urging said plate means into engagement with said piston rods, and means connecting said cylinders to opposite sides of said fluid pressure system, whereby an increase in pressure on both sides of said system simultaneously will overcome the tension of said spring means and move said plate means, but an increase in pressure on one side of said system will lock said plate means against said shaft means.

References Cited by the Examiner

UNITED STATES PATENTS

| 2,424,288 | 7/1947 | Severly | 60—52 |
| 2,479,063 | 8/1949 | Forsythe | 114—150 |
| 2,988,890 | 6/1961 | Oishei et al. | 60—52 |

MILTON BUCHLER, *Primary Examiner.*

ANDREW H. FARRELL, *Examiner.*